United States Patent [19]

Shepherd, Jr.

[11] 3,821,322

[45] June 28, 1974

[54] POLYCYCLIC COMPOUNDS

[75] Inventor: Lawrence H. Shepherd, Jr., Baton Rouge, La.

[73] Assignee: Ethyl Corporation, Richmond, Va.

[22] Filed: Sept. 17, 1973

[21] Appl. No.: 398,172

Related U.S. Application Data

[60] Continuation-in-part of Ser. Nos. 287,449, Sept. 8, 1972, abandoned, and Ser. No. 291,647, Sept. 25, 1972, said Ser. No. 287,449, Division of Ser. No. 888,071, and Ser. No. , said Ser. No. 291,647, Continuation-in-part of Ser. No. 888,071.

[52] U.S. Cl.......... 260/666 PY, 252/46.6, 260/82.1, 260/648 R, 260/648 C, 260/648 F, 260/666 A
[51] Int. Cl............................................. C07c 13/28
[58] Field of Search................. 260/666 PY, 666 A

[56] References Cited
UNITED STATES PATENTS 3,156,676  11/1964  Dekking ...................... 260/666 PY
3,183,220  5/1965  Dekking ...................... 260/666 PY
3,258,501  6/1966  Cannell ....................... 260/666 PY

*Primary Examiner*—Daniel E. Wyman
*Assistant Examiner*—A. P. Demers
*Attorney, Agent, or Firm*—Donald L. Johnson; John F. Sieberth

[57] ABSTRACT

Tricyclo[4.2.1.0$^{2,5}$]nonanes having an allylic group in the 7 or 8 position and a methyl group in the 3 position may be made by reacting in a 1:2 ratio a bicycloheptadiene with a 2-alkenyl magnesium compound co-reactive therewith to effect intermolecular addition, and then hydrolyzing the addition product so formed. These substituted tricyclo[4.2.1.0$^{2,5}$]nonanes are useful, inter alia, as monomers for the manufacture of polymers and a raw material for the synthesis of lubricating oil additives and other useful products.

5 Claims, No Drawings

POLYCYCLIC COMPOUNDS

REFERENCE TO RELATED APPLICATIONS

This application is a continuation-in-part of my prior co-pending applications Ser. No. 287,449, filed Sept. 8, 1972 now abandoned and Ser. No. 291,647, filed Sept. 25, 1972. Application Ser. No. 287,449 is in turn a division of application Ser. No. 888,071, filed Dec. 24, 1969 and now abandoned, and application Ser. No. 291, 647 is in turn a continuation-in-part of said application Ser. No. 888,071. The entire disclosure of said application Ser. No. 291,647 is incorporated herein as if fully set forth in this specification.

SUMMARY AND DESCRIPTION OF THE INVENTION

This invention relates to and provides tricyclo-[4.2.1.0$^{2,5}$]nonanes having an allylic group in the seven or eight position and a methyl group in the three position. They made be made by reacting a bicycloheptadiene hydrocarbon compound with a 2-alkenyl magnesium compound co-reactive therewith to yield an intermolecular addition product and, once the addition product is formed, hydrolyzing the same. In this reaction it is important to insure that there are at least two moles of the magnesium reactant per mole of the bicycloheptadiene reactant. In other words, the reactants are caused to react in a molar ratio of 2:1, magnesium reactant : bicycloheptadiene reactant.

The preferred compounds may be made by reacting (i) bicycloheptadiene or bicycloheptadiene substituted with one or more lower alkyl groups or lower alkenyl groups, or both, with (ii) a lower 2-alkenyl magnesium compound co-reactive with the dimer compound to effect intermolecular addition between said compounds in a mole ratio of 1:2, respectively, and then hydrolyzing the organomagnesium addition product so formed.

Suitable conditions for the addition reaction and the hydrolysis are given in application Ser. No. 291,647, filed Sept. 25, 1972.

Illustrative organomagnesium reactants (lower 2-alkenyl magnesium compounds) are allylmagnesium chloride, allylmagnesium bormide, allylmagnesium iodide, bis-allylmagnesium, methallyl magnesium chloride, methallyl magnesium bormide, methallyl magnesium iodide, bis-methallyl magnesium, 2-butenyl magnesium chloride, 2-butenyl magnesium bormide, 2-butenyl magnesium iodide, bis-(2-butenyl)magnesium, 2-pentenyl magnesium chloride, 2-hexenyl magnesium bormide, 4-methyl-2-pentenyl magnesium bromide, cinnamyl magnesium bromide, and the like. The most preferred 2-alkenyl magnesium compounds are allylmagnesium chloride and allylmagnesium bromide.

As a general rule the 2-alkenyl Grignard reactants will be subjected to the above addition reactions in a reaction medium composed predominately of an ether whereas the bis-(2-alkenyl)-magnesium reactants are usually produced and used in a reaction medium composed predominately of a suitable paraffinic, cycloparaffinic or aromatic hydrocarbon. Exemplary reaction media and further details concerning the addition reaction and the hydrolysis reaction are given in application Ser. No. 291,647, filed Sept. 25, 1972.

This invention will become still further apparent from a consideration of the following illustrative example.

Example

2:1 Reaction between allylmagnesium bromide and bicyclo[2.2.1]hepta-2,5-diene followed by hydrolysis A mixture of $C_{13}$ compounds containing two C-Mg-Br bonds was produced by heating in a small autoclave 20 mmoles of allylmagnesium bromide with 10 mmoles of bicyclo[2.2.1]hepta-2,5-diene at 125° C. for 3 hours in a diethyl ether reaction medium. Hydrolysis of the reaction product liberated a mixture of $C_{13}$ hydrocarbons having four major components, i.e., the product was composed of positional and stereo-isomers. The reaction may be depicted as follows:

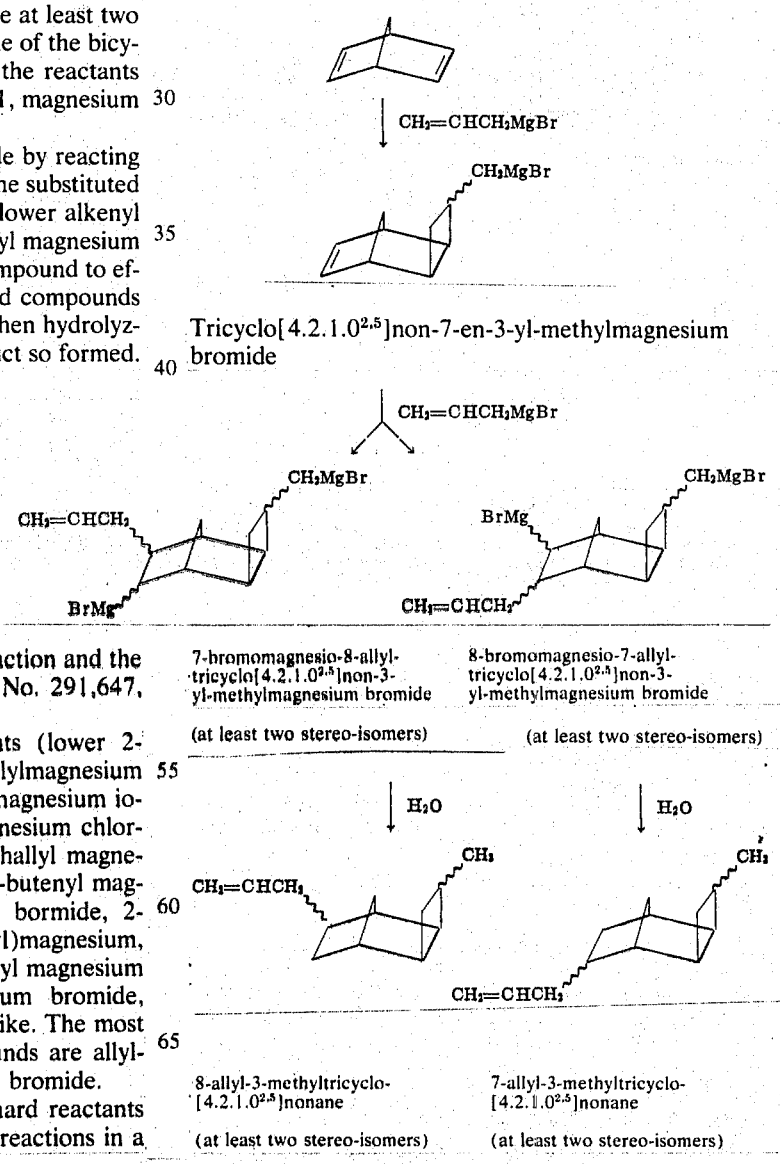

Tricyclo[4.2.1.0$^{2,5}$]non-7-en-3-yl-methylmagnesium bromide 7-bromomagnesio-8-allyl-tricyclo[4.2.1.0$^{2,5}$]non-3-yl-methylmagnesium bromide (at least two stereo-isomers)

8-bromomagnesio-7-allyl-tricyclo[4.2.1.0$^{2,5}$]non-3-yl-methylmagnesium bromide (at least two stereo-isomers)

8-allyl-3-methyltricyclo-[4.2.1.0$^{2,5}$]nonane (at least two stereo-isomers)

7-allyl-3-methyltricyclo-[4.2.1.0$^{2,5}$]nonane (at least two stereo-isomers)

Naturally if the bicycloheptadiene subjected to the addition reaction has one or more lower alkyl and/or lower alkenyl substituents in the molecule (i.e., if the ring is substituted with alkyl and/or alkenyl groups each of which (a) contains up to about 6 carbon atoms, (b) is inert under the reaction conditions, and (c) does not adversely affect the addition reaction) the resultant tricyclo[4.2.1.0$^{2,5}$]nonane produced on hydrolysis of the intermediate addition product will not only possess an allylic group in the 7 or 8 position and a methyl group in the 3 position but will retain these additional alkyl and/or alkenyl substituents. 1-Methylbicyclo[2.2.1]-hepta-2,5-diene and 7-methylbicyclo[2.2.1]hepta-2,5-diene serve as examples of suitable substituted reactants of this type. Other inert substituents (i.e., substituents which do not take part in nor prevent the desired addition reaction) may be present in the bicycloheptadiene reactant. The preferred compounds of this invention are tricyclo[4.2.1.0$^{2,5}$]nonanes having a lower 2-alkenyl group (most preferably, the allyl group) in the 7 or 8 position and a methyl group in the 3 position, further substitution, if any, being limited to (a) lower alkyl substitution, (b) lower alkenyl substitution, or (c) a combination of (a) and (b).

The novel compounds of this invention are of considerable utility. Since they possess an allylic substituent they may be utilized as alpha-olefin type monomers. For example, they may be co-polymerized with ethylene or propylene in accordance with known Ziegler/Natta type technology in order to form a variety of polymers of differing physical properties.

Another utility for the compounds of this invention is in the manufacture of lubricating oil, grease and cutting oil additives. In this utility the compounds of this invention may be reacted with phosphorus pentasulfide in accordance with known technology to produce reaction products which are useful, inter alia, as antioxidants and extreme pressure additives when employed in small concentration in lubricating oils, greases, and cutting oils. Anyone wishing further details concerning the manufacture of such products or the manner of using them may refer to the comprehensive patent literature on the subject, U.S. Pat. No. 2,534,217 serving as but one typical reference.

Since the compounds of this invention possess olefinic unsaturation they can be halogenated by standard techniques so as to add halogen atoms to the double bond and thereby produce the corresponding dibromo, dichloro and iodochloro compounds. Similarly, monohalogenated products can be formed by subjecting the compounds of this invention to hydrohalogenation using HCl or HBr, for example.

Other uses for the compounds of this invention include their use as intermediates for the manufacture of flotation chemicals, germicides, insecticides, fungicides, insect repellants, water proofing agents, plasticizers, and emulsifying agents. In addition, the compounds of this invention are flammable and thus may be used as sources of heat, light, carbon dioxide and water. Still other uses for the compounds of this invention will become evident to those skilled in the art now that the art has been furnished these new chemical compounds.

It is to be understood and appreciated that although three dimensional molecular structures have been depicted in this description of the invention, it is not intended that the invention be limited to any given geometric or stereo isomer. The three dimensional formulas depicted herein have been utilized simply as a convenient way of representing the complex polycyclic compounds involved in the practice of this invention.

I claim:

1. A tricyclo[4.2.1.0$^{2,5}$]nonane wherein the 3 position is substituted by a methyl group and wherein the 7 or 8 position is substituted by a lower 2-alkenyl group, further substitution in the molecule, if any, being limited to lower alkyl substitution or lower alkenyl substitution, or both.

2. A composition according to claim 1 wherein said 2-alkenyl group is the allyl group.

3. A composition according to claim 1 wherein said compound is 8-allyl-3-methyltricyclo[4.2.1.0$^{2,5}$]nonane, 7-allyl-3-methyltricyclo[4.2.1.0$^{2,5}$]nonane, or a mixture thereof.

4. A composition according to claim 1 wherein said compound is 8-allyl-3-methyltricyclo[4.2.1.0$^{2,5}$]nonane.

5. A composition according to claim 1 wherein said compound is 7-allyl-3-methyltricyclo[4.2.1.0$^{2,5}$]nonane.

* * * * *

UNITED STATES PATENT OFFICE
CERTIFICATE OF CORRECTION

Patent No. 3,821,322     Dated June 28, 1974

Inventor(s) Lawrence H. Shepherd, Jr.

It is certified that error appears in the above-identified patent and that said Letters Patent are hereby corrected as shown below:

> Title page, Item 60, line 4, "888,071, and Ser. No. , said Ser. No. 291,647," should read -- 888,071, Dec. 24, 1969, abandoned, said Ser. No. 291,647, --.
> Column 1, lines 56, 58, 60, and 63, "bormide" should read -- bromide --.

Signed and sealed this 1st day of October 1974.

(SEAL)
Attest:

McCOY M. GIBSON JR.
Attesting Officer

C. MARSHALL DANN
Commissioner of Patents